(12) United States Patent
Soleimani et al.

(10) Patent No.: US 12,171,355 B2
(45) Date of Patent: Dec. 24, 2024

(54) MULTI-PIECE RUG AND MAT ARRANGEMENT AND ASSEMBLY FOR FORMING A FLOOR COVERING

(71) Applicant: TUMBLE LIVING LLC, Los Angeles, CA (US)

(72) Inventors: Justin Soleimani, Los Angeles, CA (US); Zachariah Dannett, Los Angeles, CA (US)

(73) Assignee: TUMBLE LIVING, INC., Los Angeles, CA (US)

(*) Notice: Subject to any disclaimer, the term of this patent is extended or adjusted under 35 U.S.C. 154(b) by 136 days.

(21) Appl. No.: 17/506,529

(22) Filed: Oct. 20, 2021

(65) Prior Publication Data

US 2022/0117426 A1    Apr. 21, 2022

Related U.S. Application Data

(60) Provisional application No. 63/094,238, filed on Oct. 20, 2020.

(51) Int. Cl.
*B32B 3/06* (2006.01)
*A47G 27/02* (2006.01)
(Continued)

(52) U.S. Cl.
CPC ..... *A47G 27/0212* (2013.01); *A47G 27/0268* (2013.01); *A47G 27/0281* (2013.01);
(Continued)

(58) Field of Classification Search
CPC ............ A47G 27/0212; A47G 27/0268; A47G 27/0281; B32B 3/06; B32B 3/08; B32B 5/024; B32B 5/263; B32B 7/09; B32B 2255/02; B32B 2262/148; B32B 2307/7265; B32B 2471/04;
(Continued)

(56) References Cited

U.S. PATENT DOCUMENTS 3,012,919 A * 12/1961 Janney, Jr. ......... A47G 27/0475
52/273
8,309,198 B2   11/2012 Bell et al.
(Continued)

FOREIGN PATENT DOCUMENTS

CN        206544377 U  * 10/2017
WO    WO-2006106233 A1 * 10/2006 ............ E04F 15/041

*Primary Examiner* — Matthew D Matzek
(74) *Attorney, Agent, or Firm* — LAZARIS IP

(57) ABSTRACT

A multi-piece floor arrangement and assembly forms a floor covering that includes a top, or upper, rug portion and bottom, or lower, mat portion, and pocketed corner areas in each corner of an underside surface of the rug portion into which corresponding corners of the mat portion are insertable. The pocketed corner areas secure the rug portion with the mat portion when both are placed on an underlying surface while enabling a flow of air between the rug portion and the mat portion. The mat portion includes multiple interlocking sections that help to maintain the floor covering in a uniform planar shape and provide an aesthetically-pleasing appearance when placed on an underlying surface. The multi-piece arrangement and assembly does not move relative to that surface, yet does not require either a cumbersome installation or removal process.

21 Claims, 8 Drawing Sheets

(51) Int. Cl.
*B32B 3/08* (2006.01)
*B32B 5/02* (2006.01)
*B32B 5/26* (2006.01)
*B32B 7/09* (2019.01)

(52) U.S. Cl.
CPC ................ *B32B 3/06* (2013.01); *B32B 3/08* (2013.01); *B32B 5/024* (2013.01); *B32B 5/263* (2021.05); *B32B 7/09* (2019.01); *B32B 2255/02* (2013.01); *B32B 2262/148* (2021.05); *B32B 2307/7265* (2013.01); *B32B 2471/04* (2013.01)

(58) Field of Classification Search
CPC .... B32B 2262/0276; B32B 2266/0221; B32B 2471/02; B32B 3/04; B32B 5/026; B32B 2262/152; B32B 5/18; B32B 5/2795; B32B 2307/744; E04F 15/02038; E04F 15/147
USPC .......................................................... 428/96
See application file for complete search history.

(56) References Cited

U.S. PATENT DOCUMENTS

| | | | | |
|---|---|---|---|---|
| 2009/0274868 A1* | 11/2009 | Hellman | ............ | A47G 27/0206 428/123 |
| 2011/0195219 A1* | 8/2011 | Bell | .................. | A47G 27/0225 428/88 |
| 2014/0158276 A1* | 6/2014 | Higgins | ................ | D05C 17/02 156/60 |

* cited by examiner

MULTI-PIECE RUG AND MAT ARRANGEMENT AND ASSEMBLY FOR FORMING A FLOOR COVERING

CROSS-REFERENCE TO RELATED PATENT APPLICATION(S)

This patent application claims priority to U.S. provisional application 63/094,238, filed on Oct. 20, 2020, the contents of which are incorporated in their entirety herein. In accordance with 37 C.F.R. § 1.76, a claim of priority is included in an Application Data Sheet filed concurrently herewith.

FIELD OF THE INVENTION

The present invention relates to the field of carpets and rugs. Specifically, the present invention relates to a multi-piece arrangement and assembly forming a floor covering and having a combined, non-slip lateral area, in which a rug having pocketed areas into which an underlying mat is insertable to enable secure placement of thereof on an underlying surface.

BACKGROUND OF THE INVENTION

Rugs for decorative flooring to protect underlying surfaces, to improve walkability and/or moveability on underlying surfaces, for aesthetics, and for improving the warmth of a room having existed for several thousands of years at least. Rugs are typically removable, as opposed to entire-room carpeting that is usually stapled to or otherwise fixed together with an underlying surface. One issue with rugs generally is that they easily move relative to the underlying surface on which they are placed, and another is that they often curl at the edges or corners when so placed. Many approaches exist to address these issues, ranging from adding weights to sections of the rug, to securing the rug to the underlying surface, either temporarily, or permanently or semi-permanently as with typical carpeting, to including an extra surface below the rug, such as a mat, and others.

Mats are often used to add a further layer of protection to the underlying surface. Mats, however, also tend to move relative to the surface on which it is placed; additionally, one or both of the rug and mat may move relative to each other, creating an unsightly display and requiring frequent adjustment such as smoothing to make sure both components are flat and even. Other mat-related solutions involve cumbersome installation and removal processes, and require extensive fastening mechanisms to address the issue of movement relative to each other.

In addition, both rugs and mats are difficult to warehouse and ship to consumers. Due to the size and weight of such items, storing them prior to shipment requires both space and equipment, which raises the cost of maintaining inventory. Typically, rugs are rolled during storage and shipment, rendering them bulky and cumbersome for handling and storage in warehouses, and for transportation during shipment to customers.

Another issue with existing rugs and mats is that they are difficult for users to clean. Such items typically are not easily cleaned using equipment such as conventional washing machines and dryers, at least due to the thickness of materials. Further, rugs and mats typically do not include materials embedded or machined within their designs that make them easier to maintain without having to utilize such equipment.

Accordingly, there is a need in the existing art for a floor covering that does not easily slide on the surface on which it is placed, while at the same time maintaining a pleasant appearance and requiring minimal effort to maintain a position. There is also a need in the existing art for a floor covering having multiple pieces that does not require a cumbersome installation process, and does not require a further cumbersome process to remove or move the floor covering for cleaning or placement in a different location. There is still a further need in the existing art for a floor covering having multiple pieces that protects the underlying surface, and maintains its position when placed on a surface, while still providing that the two pieces do not move relative to each other while maintaining such a position. There is yet a further need in the existing art for an assembly and article of manufacture of a multi-piece arrangement that can be molded or constructed according to conventional sizes of floor coverings, or made in customized sizes, in efficient and timely processes.

There is still a further need in the existing art for a floor covering that is convenient and inexpensive to maintain in a warehouse prior to shipment. Still a further need exists for a floor covering that is easy and inexpensive to ship to consumers. There is yet a further need in the existing art for a floor covering that is easy and quick for consumers to clean and maintain.

BRIEF SUMMARY OF THE INVENTION

The present invention addresses these issues in a floor covering that maintains a pleasant appearance when deployed on an underlying surface, and does not move relative to that surface, yet does not require either a cumbersome installation or removal process. The present invention provides this in, in one embodiment thereof, a multi-piece arrangement that includes a top, rug portion and bottom, mat portion that together form such a floor covering. The top rug portion includes pocketed areas in each corner of an underside surface of the top rug portion, into which corresponding corners of the bottom mat portion are insertable to secure the top rug portion to the bottom mat portion when placed on an underlying surface, and to prevent at least the corners of the overall floor covering and associated assembly from curling when placed on the underlying surface. The bottom mat portion of the multi-piece arrangement is comprised of multiple interlocking sections which combine to maintain the bottom mat portion, and the top rug portion positioned thereupon, in a uniform planar shape when so placed.

The multi-piece arrangement of the present invention may also be styled as an assembly, in which upper and lower portions are configured to form a floor covering. The lower, mat portion is comprised of a plurality of interlocking sections which combine to maintain the lower, mat portion, and an upper, rug portion, in a uniform planar shape when together placed on an underlying surface. Pocketed corner areas affixed to an outer, bottom surface of the upper portion at each corner area thereof accept corners of the lower portion therein, to further secure the upper portion to the lower portion.

The mat portion of the multi-piece arrangement of the present invention may further have a non-porous surface that renders the floor covering easy to clean, and may be spillproof to prevent liquids or other substances from dirtying or staining the floor covering. The rug portion may also include a spillproof coating on at least one surface to further prevent liquids or other substances from dirtying or staining the floor covering. Still further, at least the rug portion of the floor covering has a thickness that remains thin enough to fit into and be cleaned using a conventional washing machine. The rug portion can easily be detached and removed from the mat portion due to the lack of a fixed fastening mechanism for cleaning and/or washing, and each modular piece of the mat portion can be separately removed and cleaned individually (e.g., in a sink, with a hose etc.)

The multi-piece arrangement of the present invention is also easily stored, handled, transported, and shipped. The rug is foldable, rather than merely rollable, and the mat portion is modular, making them less cumbersome for wholesalers, retailers, shippers, and consumers. For example, the multiple interlocking sections of the bottom, mat portion present a modular design that improves upon existing technology at least by making the floor covering and assembly much easier to warehouse and ship both to the warehouse and directly to consumers.

The present invention may, in an alternate embodiment thereof, comprise a floor covering that includes either a rug portion or a mat portion. The present invention may therefore be packaged and/or sold separately as floor coverings that include one or both of the rug portion and the mat portion.

It is one objective of the present invention to provide a floor covering. It is another objective of the present invention to provide a multi-piece arrangement for such a floor covering that includes a rug portion and a mat portion. It is still another objective of the present invention to provide a multi-piece arrangement for such a floor covering, where the rug portion and mat portion couple together in a manner that does not permit movement on the surface on which the multi-piece arrangement is placed.

It is still another objective of the present invention to provide a multi-piece arrangement for such a floor covering that maintains a pleasant appearance and requires minimal effort to maintain a substantially planar position relative to the surface on which the multi-piece arrangement is placed. It is yet another objective of the present invention to provide a multi-piece arrangement for such a floor covering where the portions thereof do not move relative to each other while maintaining such a position.

It is a further objective of the present invention to provide a multi-piece arrangement for such a floor covering where the portions thereof are easily placeable on an underlying surface, and do not require a cumbersome installation process. It is still a further objective of the present invention to provide a multi-piece arrangement for such a floor covering where the portions thereof do not require a further cumbersome process to remove or move the floor covering, for example for cleaning or placement in a different location, or for storage. It is yet a further objective of the present invention to provide an assembly, and article of manufacture thereof, that is comprised of a multi-piece arrangement that can be molded or constructed according to conventional sizes of floor coverings, or made in customized sizes, in efficient and timely processes. It is yet another objective of the present invention to provide a floor covering and associated assembly that is both easy to store and ship to consumers, and easy for such consumers to clean.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
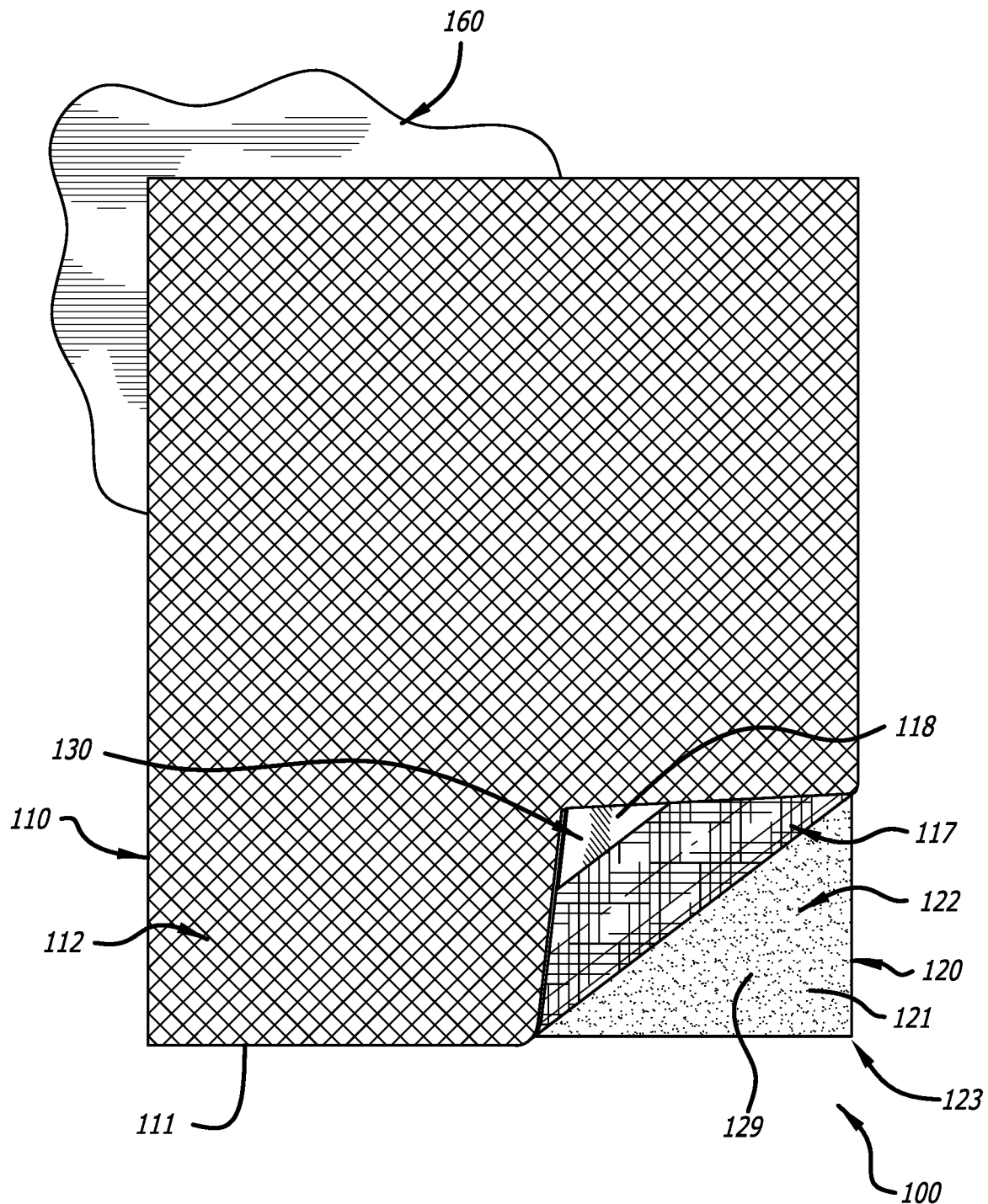
FIG. 1 is a top view of a multi-piece arrangement for forming a floor covering according to one embodiment of the present invention, shown facing a top surface of a top layer of a rug portion as the multi-piece arrangement would be positioned upon an underlying surface.

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a multi-piece arrangement 100 that serves as a floor covering or other decorative and/or protective item. The multi-piece arrangement 100 includes a rug portion 110 and a separate mat portion 120 which is capable of coupling to the rug portion 110 to form the floor covering. Reference numeral 100 is utilized herein to refer to such a multi-piece arrangement, and the present invention is styled herein as such; but it is to be understood that the term 'present invention', and reference numeral 100, may also be used to refer to a multi-piece floor covering, and an assembly for such a floor covering, as discussed further herein.

FIGS. 1, 2A, 2B and 3

Figure 2A:
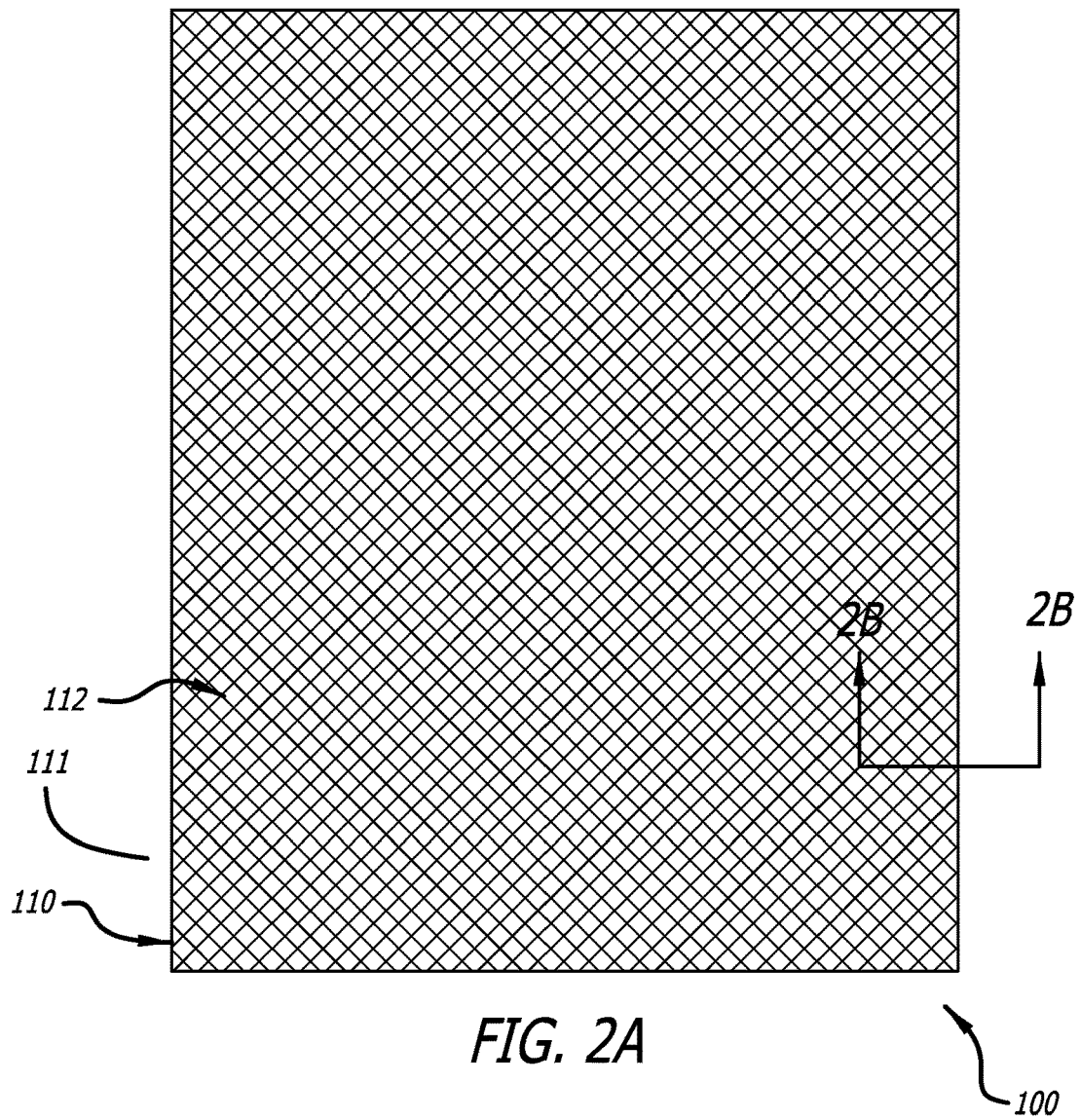
FIG. 2A is a further top view of the top surface and layer of the rug portion of the multi-piece arrangement according to the embodiment of FIG. 1.
Figure 2B:
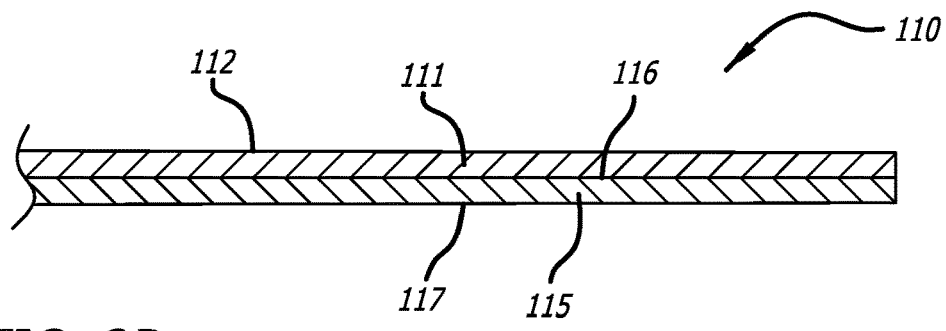
FIG. 2B is a cross-sectional view of the rug portion of the multi-piece arrangement as indicated in FIG. 2A.
Figure 3:
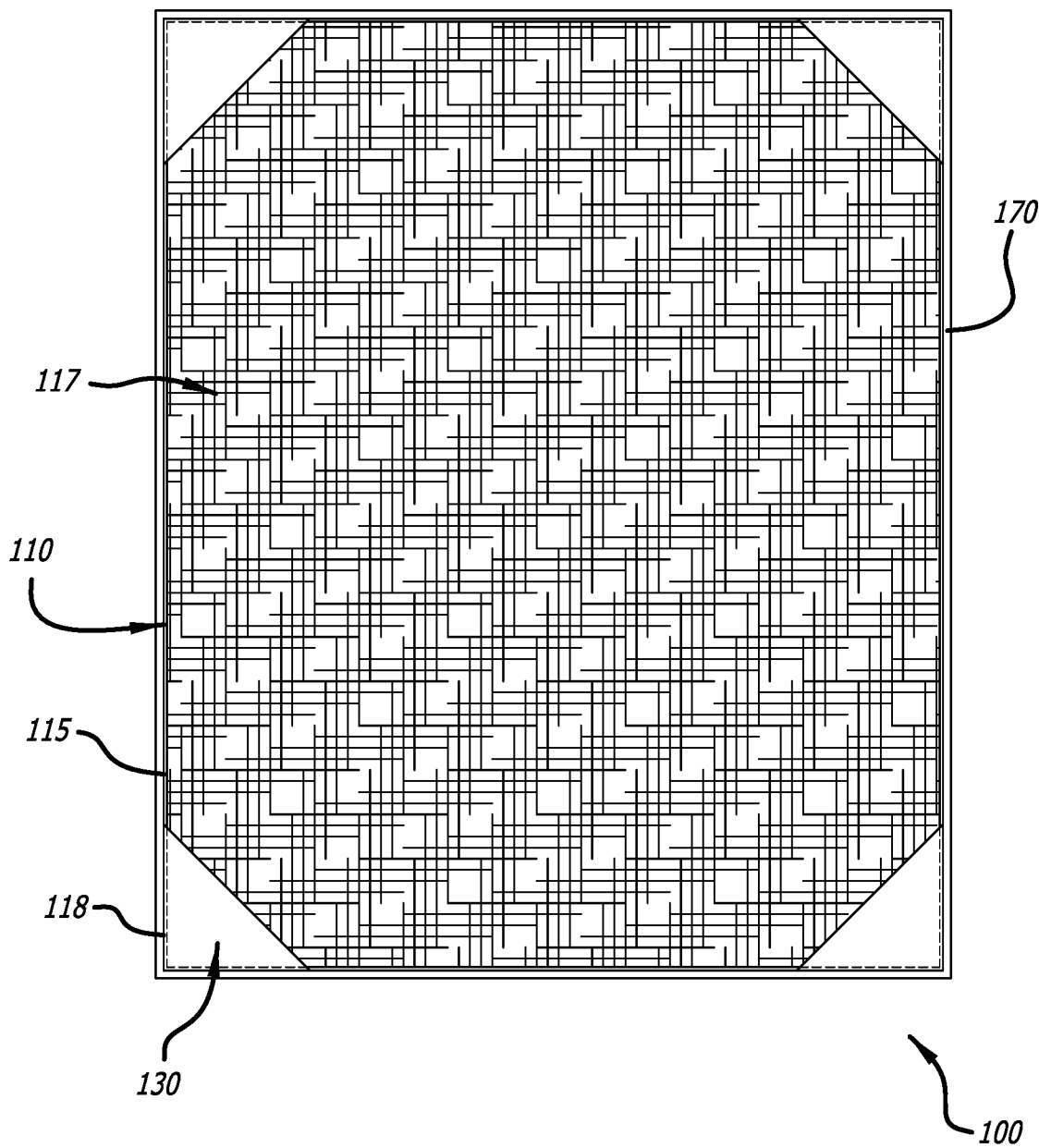
FIG. 3 is a bottom view of the rug portion of the multi-piece arrangement of FIG. 2A, shown facing a bottom surface and bottom layer of the rug portion, according to one embodiment of the present invention.

FIG. 1 is top or plan view of the multi-piece arrangement 100 of the present invention as it would lay when fully deployed upon an underlying surface 160. FIG. 1 shows a corner 118 of the rug portion 110 pulled back from, and separate from, the separate mat portion 120 to show the rug portion 110 and reveal the separate mat portion 120 beneath it. FIG. 2A is a top or plan view of a top surface 112 of just the rug portion 110 of FIG. 1; FIG. 2B is a cross-sectional view of the rug portion 110 of FIG. 2A. FIG. 3 is a bottom view of the rug portion 110 according to one embodiment of the present invention, shown facing a bottom surface 117 of the rug portion 110, with a coating applied to one or more surfaces of either or both of the rug portion 110 and the mat portion 120.

The rug portion 110 may, in an alternative embodiment of the present invention, be implemented as a multi-layered composition that at least includes a top layer 111 as shown in FIG. 1, and a bottom layer 115 as shown in FIG. 2B and FIG. 3. The top layer 111 may be, in one example of such an implementation, comprised of a polyester or polyester blended fabric, such as for example chenille. The rug portion 110 may also itself be comprised of such a fabric where the present invention is not implemented as a multi-layered composition. Regardless, it is to be understood that any suitable fabric or material may be utilized, and the present invention is not to be limited to any one type of fabric described herein.

Regardless of the fabric, different weaves and weights are contemplated and are within the scope of the present invention; for example, the rug portion 110 (and top layer 111, where implemented) may comprise a chenille or other fabric of between 100 and 500 grams per square meter; however, it is to be understood than any weave or weight be used, and the present invention is not to be limited to any specific figure, amount, or numeral (or range thereof) referenced herein. Also, a design may be incorporated into at least a top surface 112 of the rug portion 110, for example a printed design, to provide an aesthetically-pleasing appearance for the floor covering. Still further, a coating may also be applied to at least the top surface 112 to ensure that the rug portion 110 is waterproof, and such a waterproof coating may be extended throughout the rug portion 110 to the bottom surface 117, to provide more complete protection from spills and make at least the top surface 112 easy to clean (and protect the entire rug portion 110 itself) without removing the multi-piece arrangement 100 from the underlying surface 160 on which it is placed, and without removing the rug portion 110 from the mat portion 120.

Where the rug portion 110 is comprised of one or more layers, a bottom layer 115 may be, in one embodiment, also comprised of a polyester or blended polyester fabric, such as for example a knitted polyester. However, as with the top layer 111, it is to be understood that any suitable fabric or material may be utilized, and the present invention is not to be limited to any one type of fabric described herein. Regardless of the fabric, different weaves and weights are also contemplated and are within the scope of the present invention for such a bottom layer 115, such as for example between 100 and 500 grams per square meter. However, it is to be understood than any weave or weight may be used, and the present invention is not to be limited to any specific figure, amount, or numeral (or range thereof) referenced herein.

The rug portion 110 may have a rectangular shape as shown in FIG. 1, FIG. 2A, and FIG. 3, thereby forming a floor covering having the same or similar rectangular shape. However, it is to be noted that the floor covering, and the multi-piece arrangement 100 that includes the rug portion 110, may have any shape, for example a square or a trapezoid, and the rug portion 110 is not to be limited to the shapes shown in FIG. 1, FIG. 2A and FIG. 3, nor any other shape.

Figure 6:
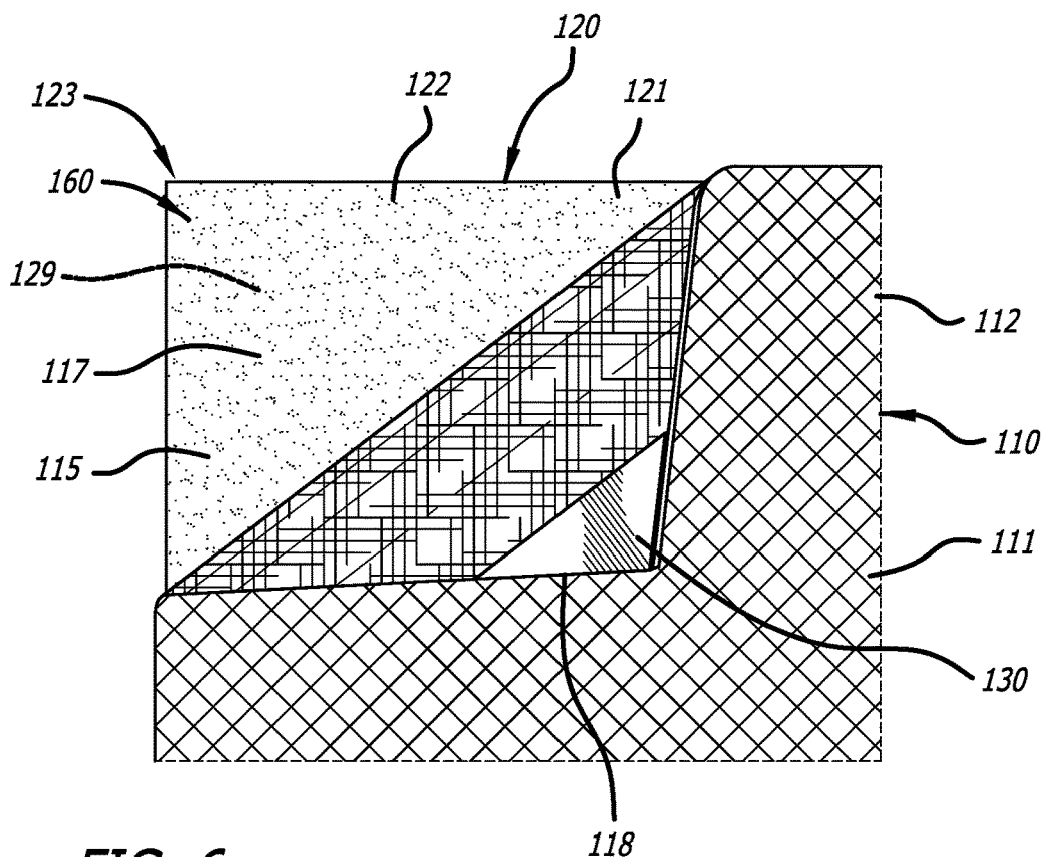
FIG. 6 is a close-up view of a corner portion of the multi-piece arrangement of the present invention as shown in FIG. 1, showing a corner of the rug portion pulled back to reveal the separate mat portion and the corner pocket.

As shown further in FIG. 1, FIG. 3, and as indicated in FIGS. 6-10, the multi-piece arrangement 100 may also include a means for removably coupling the rug portion 110 to the mat portion 120. Such a means may include a plurality of pocketed areas 130 at corners 118 of the rug portion 110 that are attached to a bottom surface 117 thereof. FIG. 6 is a close-up view of one such pocketed area 130 of the rug portion 110 of the multi-piece arrangement 100 of the present invention as shown for example in FIG. 1, showing the corner area 118 of the rug portion 110 pulled back to reveal the separate mat portion 120 lying beneath it. Additionally, FIG. 7B is a cross-sectional view of one corner area 118 of the multi-piece arrangement 100 of the present invention, shown as deployed on an underlying surface 160.

The plurality of corner pocketed areas 130 may form, in one embodiment of the present invention, the shape of triangles. Regardless of the size of triangle or any other specific shape, the plurality of pocketed areas 130 may have sides that extend a particular distance along the longer sides of the rectangular shape of the rug portion 110 as indicated in FIGS. 1, 3, 6, 7A, and 8-10 that extend from ends of the rug portion 110. This particular distance is to be long enough to support a part of the corner 123 of the mat portion 120 with enough strength to securely hold the corner 123 of the mat portion 120 therein. For example, each pocket at each pocketed area 130 may have two sides that extend a length of approximately 25 cm from the end of each longer side of the rug portion 110. Each side of the pocket at each pocketed area 130 at each corner 118, running along the sides of the rug portion 110, may also be of different lengths from each other, or the same length.

The plurality of pocketed areas 130 may be formed of any material that is capable of serving as a secure holding mechanism for corners 123 of the mat portions 120. Additionally, the material may be a natural fabric or a synthetic fabric, or a blend of such fabrics, and further may not be a textile-based material at all. For example, the plurality of pocketed areas 130 may be formed of plastic or other similar composition, or a combination of textile and non-textile-based materials. It is therefore to be understood that the present invention is not to be limited to any particular material described herein for holding corners 123 of the mat portion 120 in place when the rug portion 110 and the mat portion 120 are affixed together.

A binding 170 may also extend along the edges of the rug portion 110, and around the entire perimeter or border of the rug portion 110. The binding 170 may be formed by stitching, serging, sewing, or gluing the edges of the rug portion 110. This binding 170 may have any thickness; in one embodiment, the binding 170 is approximately 1 cm thick. The binding 170 is designed to slightly overhang the edges of the mat portion 120 when the rug portion 110 is coupled to the mat portion 120 as shown in FIG. 7A, and FIGS. 8-10; this slight overhang, plus the combined weight of the binding 170, further ensures that the rug portion 110 and the mat portion 120 remain securely coupled together when the multi-piece arrangement 100 is deployed on an underlying surface 160.

In the embodiment(s) where the rug portion 110 and/or the mat portion 120 are comprised of multiple layers, the top layer 111 and the bottom layer 115 of the rug portion 110 may be adhered together, for example by weaving materials between the top layer 111 and bottom layer 115, or by sewing, stitching, gluing, or otherwise complexing various portions of the top layer 111 and bottom layer 115 together to form a single composition comprised of multiple layers. The binding 170 may extend along the edges of the rug portion 110, and around the entire perimeter or border of the rug portion 110, and may be formed by stitching, serging, sewing or gluing the top layer 111 and the bottom layer 115 together, for example by providing extra stitching at the ends of the top layer 111 and the bottom layer 115. This binding 170, as in embodiments where the rug portion 110 does not have multiple layers, may have any thickness; in one embodiment, the binding 170 is approximately 1 cm thick.

Mat Portion

Figure 4:
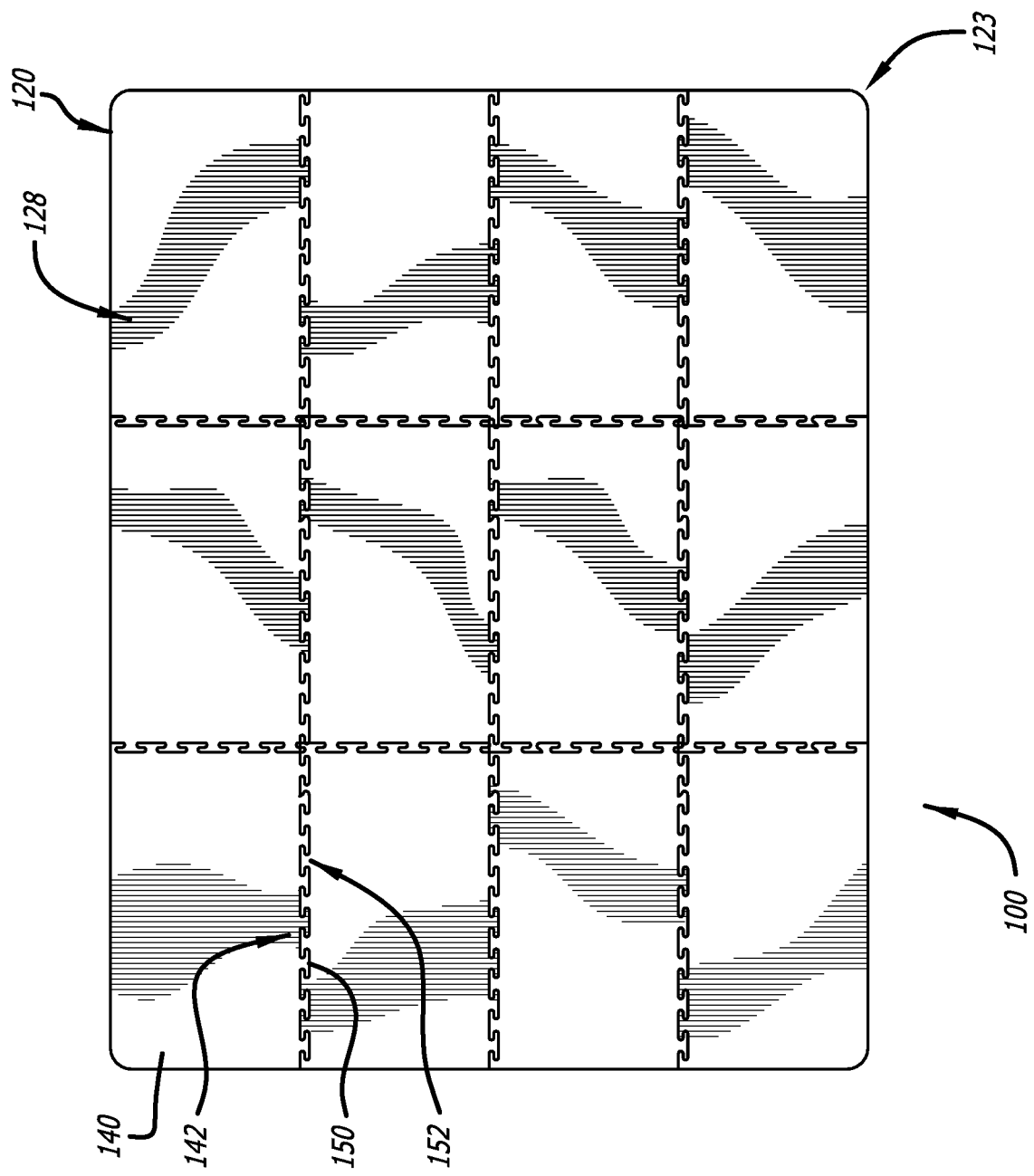
FIG. 4 is a top view of a top surface of a top layer of a separate mat portion of an exemplary size and configuration of the multi-piece arrangement, showing interlocking portions placed together to form the separate mat portion, according to one embodiment of the present invention.

FIG. 4 is a top or plan view of the mat portion 120, showing interlocking sections 140 placed together according to an exemplary size and configuration in one embodiment of the present invention. In embodiment(s) where the mat portion 120 is a multi-layer composition, the mat portion 120 may have a top surface 122 and a bottom surface (not shown), while the bottom layer 128 may have both a top surface (not shown) and a bottom surface 129. Regardless, it is to be understood that FIG. 4 illustrates one size and configuration, and as indicated further herein, different sizes and different configurations of the mat portion 120 are possible, contemplated, and within the scope of the present invention.

The mat portion 120 may be formed into the plurality of interlocking sections 140 in many different configurations as indicated in FIGS. 7A and 8-10. In embodiment(s) where the mat portion 120 is a multi-layered composition, the mat portion 120 may also include a middle layer 125 that is comprised of the different interlocking sections 140, and which is covered, coated, or laminated with a material or materials which comprise the top layer 121 and the bottom layer 128.

Such a middle layer 125 may be made of one or more materials which create a closed-cell foam, such as for example a polymer comprised at least of ethylene-vinyl acetate, or EVA. However, it is to be understood that other materials may be utilized to achieve the same or similar foam or foam-like middle layer 125, and the present invention is not to be limited in scope to any particular type of material that can be used to create such a foam or foam-like layer for the mat portion 120. Still further, different materials may be utilized which create a middle layer 125 that does not have foam or foam-like properties, and therefore, may or may not comprise foam at all. Regardless, the middle layer 125 of the present invention may have a particular thickness, for example 5 mm, and a smooth texture that allows for the addition of the coating or laminate as noted below; and these properties of the middle layer 125 (and others) also lend themselves to enabling the plurality of interlocking sections 140 to hold their shape and position relative to each other, so that the multi-piece arrangement 100 lies on the underlying surface 160 upon which it is placed without the mat portion 120 coming apart during usage when placed on an underlying surface 160.

Interlocking Sections

As noted above, the mat portion 120 may be separated into a plurality of interlocking sections 140. The number and dimensions of the interlocking sections 140 that together comprise the mat portion 120 may vary, at least depending on the size of the floor covering desired, as noted further herein. It should be noted that any number of interlocking sections 140 may comprise the mat portion 120, and further that the mat portion 120 may be a singular piece of material that does not include any interlocking sections 140; accordingly, the present invention is not to be limited to any number of interlocking sections 140 presented herein.

Figure 5:
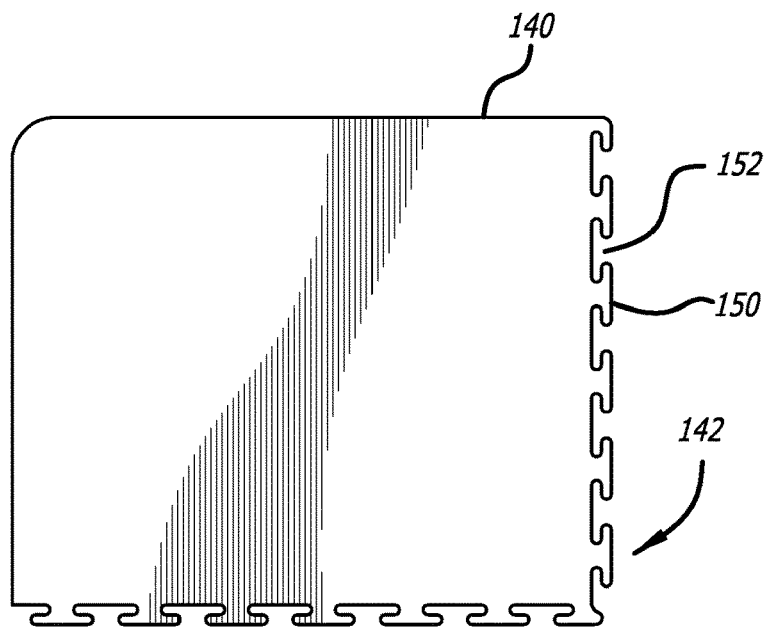
FIG. 5 is a close-up view of an interlocking section of the separate mat portion of the multi-piece arrangement of the present invention.

FIG. 5 is a close-up view of an interlocking section 140 of the separate mat portion 120 of the multi-piece arrangement 100 of the present invention. The plurality of interlocking sections 140 each have a plurality of interlocking teeth 150 formed along at least one edge 142 of each interlocking section 140. These interlocking teeth 150 allow each interlocking section 140 to couple with at least other interlocking section 140 to form the coupled nature of the interlocking sections 140 that together form the mat portion 120 when assembled, and keep the interlocking sections 140 in place when deployed. Each tooth 150 may have a uniform length and width, for example 2.3 cm. However, as with the interlocking sections 140 themselves, the interlocking teeth 150 may be of different lengths and different widths, and may not be the same in length or width. Any number of interlocking teeth 150 may be formed along edges 142 of the interlocking sections 140.

Each set of interlocking teeth 150 along each edge 142 of an interlocking section 140 having such interlocking teeth 150 are formed so that each tooth 150 has at least one gap 152 formed between it and a neighboring tooth 150. These gaps 152 allow a tooth 150 on an edge 142 of an opposing interlocking section 140 to be securely inserted therein, and the plurality of interlocking teeth 150 are molded in such a way so that the interlocking teeth 150 cannot be removed from a gap 152 without applying either an element of force, or by lifting the interlocking section in a non-planar manner relative to the opposing section to which it is coupled along the coupling edge 142. In this manner, the mat portion 120 holds its shape when the plurality of interlocking sections 140 are coupled together.

FIG. 4, FIG. 7A, and FIGS. 8-10 illustrate different schemes for placement of the interlocking sections 140 and represent various dimensions of the multi-piece arrangement 100 of the present invention. It is to be understood therefore, and as noted above, that the multi-piece arrangement 100 of the present invention may have many different dimensions, and indeed any dimension of a floor covering may be represented by the multi-piece arrangement 100. For example, at least FIGS. 4, 7A and 8-10 indicate various conventional dimensions that a floor covering formed by the multi-piece arrangement 100 may have, such as for example 8 ft by 10 ft (FIG. 4 and FIG. 7A), 5 ft by 7 ft (FIG. 8), 3 ft by 5 ft (FIG. 9), and 2.5 ft by 7 ft (FIG. 10, otherwise referred to as a hallway or runner).

Figure 7A:
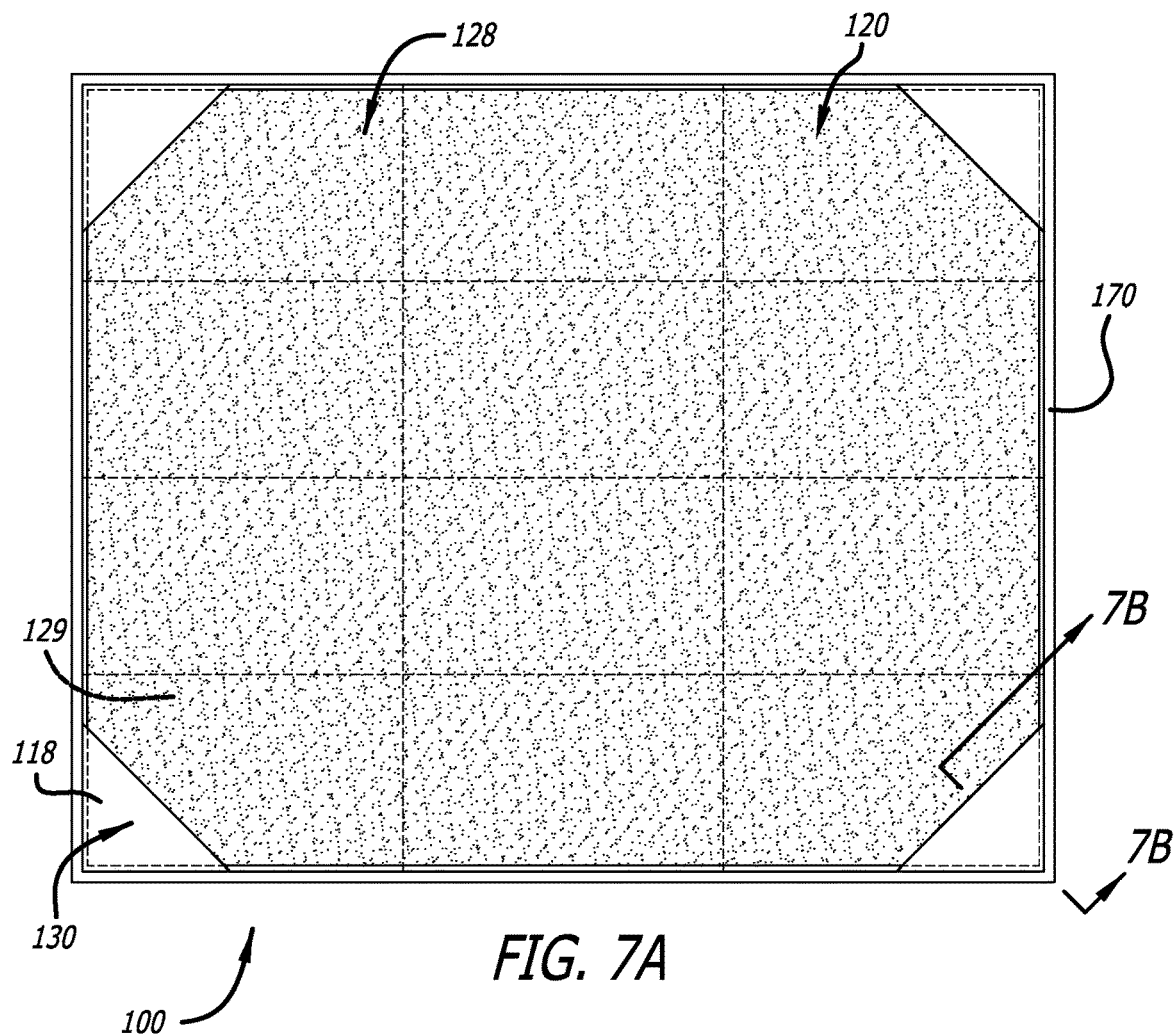
FIG. 7A is a bottom view of the multi-piece arrangement of the present invention, shown facing the bottom surface of the bottom layer of the separate mat portion.
Figure 7B:
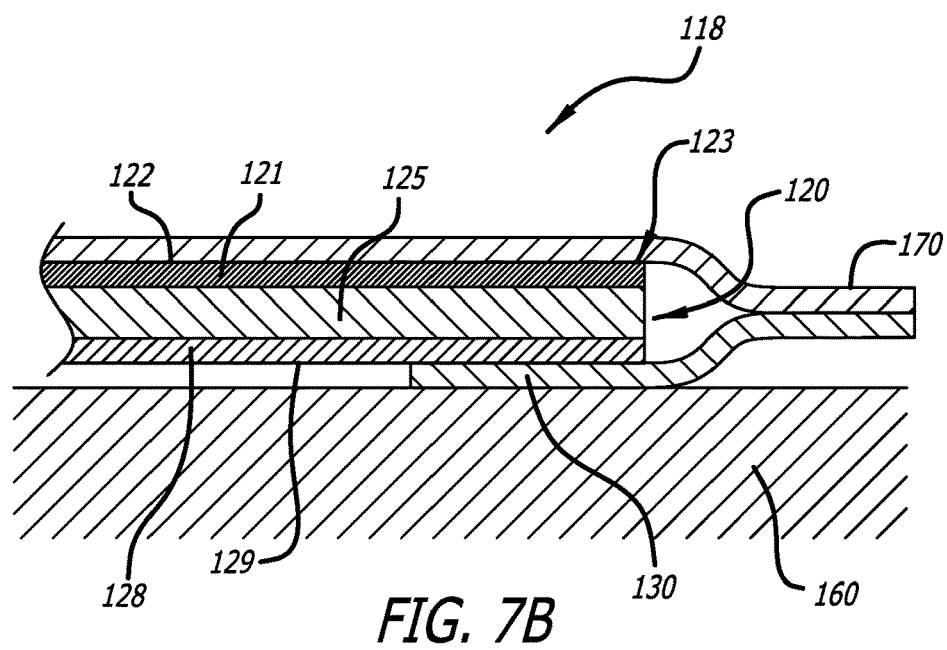
FIG. 7B is a cross-sectional view of one corner area of the multi-piece arrangement of the present invention, shown as deployed on an underlying surface.
Figure 8:
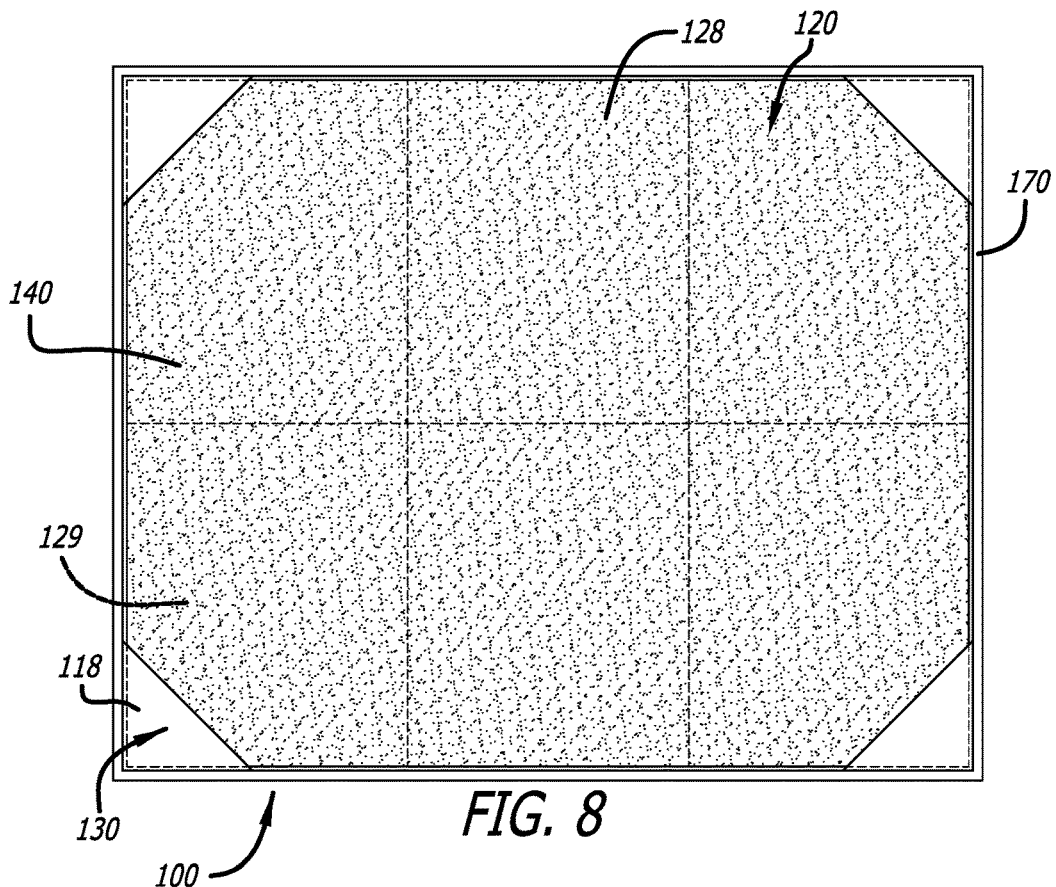
FIG. 8 is a bottom view of the multi-piece arrangement of the present invention, showing interlocking portions of the separate mat portion having an exemplary form of a 5-foot by 7-foot floor covering according to another embodiment.
Figure 9:
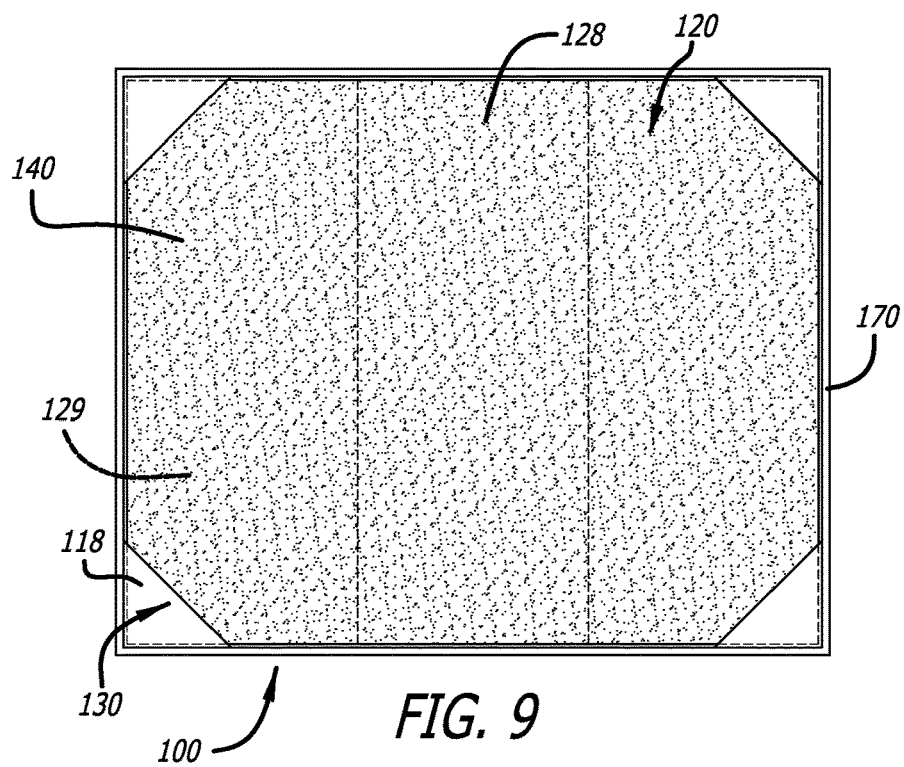
FIG. 9 is a bottom view of the multi-piece arrangement of the present invention, showing interlocking portions of the separate mat portion having an exemplary form of a 3-foot by 5-foot floor covering according to another embodiment.
Figure 10:
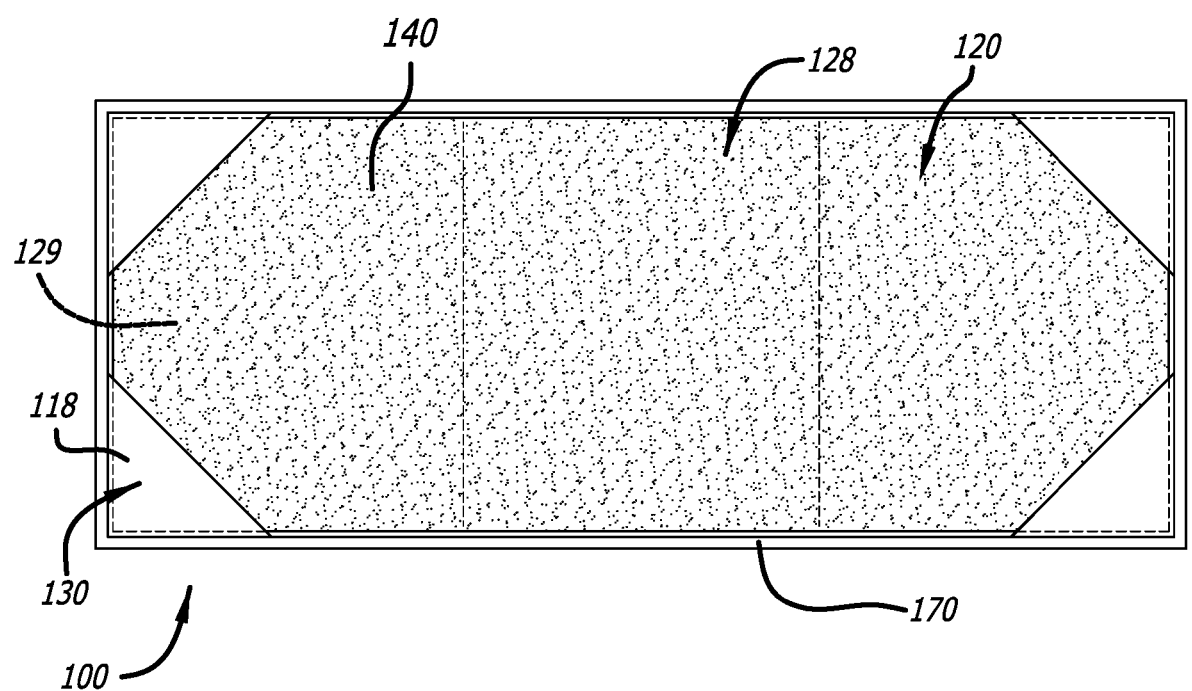
FIG. 10 is a bottom view of the multi-piece arrangement of the present invention, showing interlocking portions of the separate mat portion having an exemplary form of a hallway or runner floor covering according to another embodiment.

Each such dimensional configuration may have different numbers of interlocking sections 140. For example, as shown in FIG. 4 and FIG. 7A, a floor covering formed by the multi-piece arrangement 100 having a size of 8 ft by 10 ft may include a mat portion 120 having twelve interlocking sections 140, while a floor covering formed by the multi-piece arrangement 100 having a size of 5 ft by 7 ft (as shown in FIG. 8) may include a mat portion 120 having six interlocking sections 140. Still further, a floor covering formed by a multi-piece arrangement 100 having a size of 3 ft by 5 ft (as shown in FIG. 9) may include a mat portion 120 having three interlocking sections 140, and a floor covering formed by a multi-piece arrangement 100 having a size of 2.5 ft by 7 ft (as shown in FIG. 10) may include a mat portion 120 having three interlocking sections 140. It is to be understood therefore that in each case, the number of interlocking sections 140 may be different, and that the different sizes of floor coverings formed by the multi-piece arrangement 100 may each have a different number of interlocking sections 140. Still further, each floor covering size may be comprised of different numbers of interlocking sections 140. For example, the 8 ft by 10 ft floor covering may have 9 interlocking sections 140, and the 2.5 ft by 7 ft flooring covering may have two interlocking sections 140. Therefore, the present invention is not to be limited to particular numbers of interlocking sections 140 shown or described herein for any particular size of a floor covering formed by a multi-piece arrangement 100 (nor for any specific dimensions of interlocking sections 140 shown or described herein). It is to be further understood that other sizes of floor coverings and multi-piece arrangements 100 are contemplated, having different dimensions, and neither is the present invention to be limited to any particular size of floor covering mentioned specifically shown or described herein.

Still further, and as with the rug portion 110, it is to be noted that the mat portion 120 may have a rectangular shape, thereby forming a floor covering formed by multi-piece arrangement 100 having the same or similar rectangular shape. However, a floor covering may have any shape, for example a square, and the mat portion 120 is therefore also not to be limited to the shapes shown in the accompanying Figures, nor any other shape. Similarly, neither are the interlocking sections 140 to be limited to any shapes shown in FIGS. 3-5, 7A, and 8-10. FIGS. 3-5, 7A, and 8-10 therefore indicate exemplary dimensions for the plurality of interlocking sections 140 only.

Different dimensions of the plurality of interlocking sections 140 may be used within the same mat portion 120 to achieve floor coverings of conventional sizing. Therefore, regardless of the number of interlocking sections 140 included in a multi-piece arrangement 100 having a particular size, the plurality of interlocking sections 140 may not all be uniform in dimension. For example, in the configuration of FIG. 7A where the floor covering has a size of 8 ft by 10 ft, some interlocking sections 140 may be 99.5 cm by 58 cm, while others may be 99.5 cm by 59 cm. Still others within the same configuration may be 98.3 cm by 58 cm, and 98.3 cm by 59 cm. Similarly, in FIG. 8, where the flooring has a size of 5 ft by 7 ft, some interlocking sections 140 may have a size of 73.55 cm by 69 cm, while others have a size of 73.55 cm by 67.8 cm.

The rug portion 110 and the mat portion 120 may include a laminate comprised of a resin, a plastic or rubber, for example a thermoplastic resin. This thermoplastic resin may impart anti-slip qualities to the mat portion 120 when applied as the upper or top surface, so that the mat portion 120 does not easily move relative to the rug portion 110 when placed on top of it, and/or relative to an underlying surface upon which the floor covering formed by the multi-piece arrangement 100 is placed. Regardless, the thermoplastic resin laminate forms a coating on the plurality of interlocking sections 140, such that each interlocking section 140 has a coating on both the top and bottom surfaces thereof. Each of the rug portion 110 and mat portion 120 may comprise the same laminate coating, or comprise different coatings from each other, yet still impart anti-slip properties to the floor covering.

Together, the plurality of interlocking sections 140 and the plurality of interlocking teeth 150 ensure that the mat portion 120 maintains a uniform, and substantially planar or flat, shape when deployed on an underlying surface. This in turn provides a flat, planar surface upon which the rug portion 110 is placed. Additionally, the non-slip laminate coating also ensures that the rug portion 110 and the mat portion 120 lay substantially flat together by discouraging movement of the rug portion 110 relative to the mat portion 120. The pocketed areas 130 at corners 118 of the rug portion 110, into which corners 123 of the mat portion 120 are placed within the pocketed areas 130 further promote a uniform, and substantially planar or flat, shape to the floor covering formed by the multi-piece arrangement 100 when positioned on an underlying surface 160.

Additionally, the plurality of interlocking sections 140, when coupled together via the plurality of interlocking teeth 150, also enable the mat portion 120 to have a form that is substantially similar to the rug portion 110. Such a substantially similar form means that both the rug portion 110 and the mat portion 120 have a form that allows them to lie together in a mostly flat configuration in the same shape as each other and so that neither of the two portions move relative to the other to a degree that would render the multi-piece arrangement 100 unusable as a floor covering. For examples, as with the rug portion 110, the mat portion 120 may have a rectangular shape, thereby forming a multi-piece floor covering 100 having the same or similar rectangular shape together with the rug portion 110.

Assembly Aspect

In another aspect of the present invention, when combined the rug portion 110 and mat portion 120 operate as an assembly 100 that creates a floor covering that is laterally non-slip relative to an underlying surface 160 upon which it is placed. As noted above, the plurality of interlocking sections 140, plurality of interlocking teeth 150, and laminate coating of the mat portion 120, and the plurality of pocketed areas 130 of the rug portion 110 which accept corners 123 of the mat portion 120, together ensure that the rug portion 110 and mat portion 120 stay together relative to each other when placed on the underlying surface 160, yet are not coupled together other than at the corners thereof. In other words, the rug portion 110 and the mat portion 120 are non-slip relative to each other, yet are not fully fastened together.

Accordingly, the multi-layered arrangement 100 may, in addition to being regarded as a floor covering, may also be styled as an assembly 100 having a multi-layered upper or rug portion 110, and a plurality of pocketed areas 130 affixed to an outer surface 116 at each corner 118. Such an assembly 100 also includes a lower, mat portion 120, comprised of a plurality of interlocking sections 140 and a plurality of interlocking teeth 150 positioned along edges 142 of at least two sides of each interlocking section 140, so that each section 140 is interlockable with at least one other section 140. The mat portion 120 (and consequently each interlocking section 140) has a coating applied thereto to form a non-slip condition on each of a top side and a bottom side of the plurality of interlocking sections 140, so that the lower portion 120 does not slip relative to the multi-layer upper portion 110 when coupled together by the plurality of pocketed areas 130, and does not slip relative to the underlying surface 160 upon which the assembly 100 is placed.

These pocketed areas 130 secure the assembly 100 in a desired position, by securing the multi-layered upper or rug portion 110 to the lower or mat portion 120 together at corners 123 of the lower or mat portion 120, so that the multi-layered upper or rug portion 110 and the lower or mat portion 120 lay flush with each other. Movement of the multi-layered upper or rug portion 110 is laterally and transversely fixed relative to the lower or mat portion 120, when the assembly 100 is placed on a surface 160.

Regardless of how it is styled, the present invention ensures that installation and removal processes for the floor covering formed by the multi-layer arrangement 100 are neither cumbersome nor time-consuming. A user wishing to deploy the multi-piece arrangement 100 of the present invention needs only to assemble the mat portion 120, insert its corners 123 into the plurality of pocketed areas 130 on the bottom surface 117 of the bottom layer 115 of the rug portion 110, and smooth out the rug portion 110 so that it lies flush with the mat portion 120. The multi-piece arrangement 100 can then be placed on the desired underlying surface 160; when the user wishes to take up the floor covering formed by the multi-piece arrangement 100, for either moving, washing, or storage, the user needs only to disengage the corners 123 of the mat portion 120 from the plurality of pocketed areas 130 to separate the rug portion 110 and the mat portion 120.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Notwithstanding that the numerical ranges and values setting forth the broad scope of the invention are approximations, and that the numerical ranges and values set forth in the specific examples are reported as precisely as possible, it is to be understood that any numerical range or value inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." If the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, the terminology used herein is for the purpose of describing particular embodiments only and is not intended to limit the scope of the present invention, which is defined solely by the claims. Accordingly, the present invention is not limited to that precisely as shown and described.

The invention claimed is:

1. An area rug assembly, comprising:
   a rug portion;
   a plurality of pocketed areas affixed to a bottom surface of the rug portion at each corner area thereof only and at no other position along the bottom surface; and
   a mat portion having substantially the same dimensions as the rug portion, the mat portion comprised of multiple pieces that interlock to form a single mat, and having a non-slip material on a top surface of the mat portion, wherein each corner of the mat portion is insertable into a pocketed area of the plurality of pocketed areas at one of the corner areas of the bottom surface of the rug portion to secure the rug portion and the mat portion together, so that the bottom surface of the rug portion lies flush with a top mat surface of the mat portion, and
   wherein the plurality of pocketed areas and the non-slip material on the top surface of the mat portion allow the rug portion to remain loosely positioned relative to the mat portion without having to stretch the rug portion over the mat portion, while at the same time preventing the rug portion and mat portion from moving relative to each other and so that the rug portion is fixed relative to the mat portion to form an area rug assembly in which the rug portion and the mat portion are movable together as a single piece when the area rug assembly is placed on an underlying surface.

2. The area rug assembly of claim 1, further comprising a coating applied to a bottom surface of the mat portion, wherein the coating applied to the bottom surface and the insertion of each of the corners the mat portion into one of the plurality of pocketed areas allow an entirety of the area rug assembly to be laterally non-slip relative to the underlying surface.

3. The area rug assembly of claim 1, wherein the rug portion comprises a blended fabric.

4. The area rug assembly of claim 1, wherein the rug portion includes a waterproof coating.

5. The area rug assembly of claim 1 wherein the rug portion is comprised of a plurality of layers that include a top rug layer and a bottom rug layer, and wherein the mat portion is comprised of a plurality of mat layers that at least include a top mat layer and a bottom mat layer.

6. The area rug assembly of claim 5, further comprising a waterproof coating that extends through the top rug layer and the bottom rug layer.

7. The area rug assembly of claim 1, further comprising a binding extending along an edge of each side of the rug portion.

8. The area rug assembly of claim 7, wherein the binding is sewn along each edge of the rug portion.

9. The area rug assembly of claim 1, wherein each of the plurality of pocketed areas comprise a triangular shape with two closed sides and one open side for accepting a corner of the mat portion.

10. The area rug assembly of claim 1, further comprising a printed design on at least a segment of the rug portion.

11. An assembly, comprising:
    an upper portion;
    a lower portion having a top surface and a bottom surface, and having a non-slip material on the top surface; and
    means, affixed to a bottom surface of the upper portion at each corner area thereof only and at no other position along the bottom surface, for removably coupling the lower portion to the upper portion,
    wherein the means for removably coupling the lower portion to the upper portion and the non-slip material on the top surface allow the upper portion to remain loosely positioned relative to the lower portion without having to stretch the upper portion over the lower portion, so that the upper portion and the lower portion lay flush with each other, while at the same time preventing the upper portion and lower portion from moving relative to each other so that movement of the upper portion is fixed relative to the lower portion to form an area rug in which the upper portion and the lower portion are movable together as a single piece, when the area rug is placed on an underlying surface.

12. The assembly of claim 11, further comprising a coating applied to the bottom surface of the lower portion to form a non-slip condition, wherein the coating applied to the bottom surface of the lower portion and an insertion of the corners of the lower portion into the plurality of pocketed areas, allow an entirety of the area rug to be laterally non-slip relative to the underlying surface.

13. The assembly of claim 11, wherein the upper portion comprises a blended fabric.

14. The assembly of claim 11, wherein the upper portion includes waterproof coating.

15. The assembly of claim 11, wherein the upper portion is comprised of a plurality of layers that include a top upper layer and a bottom upper layer, and wherein the lower portion is comprised of a plurality of layers that at least include a top lower layer and a bottom lower layer.

16. The assembly of claim 15, further comprising a waterproof coating that extends through the top upper layer and the bottom upper layer.

17. The assembly of claim 11, further comprising a binding extending along each edge of the upper portion.

18. The assembly of claim 17, wherein the binding is sewn along each edge of the upper portion.

19. The assembly of claim 11, wherein the means for removably coupling the lower portion to the upper portion comprises a plurality of pocketed areas configured at each corner of a bottom surface of the upper portion.

20. The assembly of claim 19, wherein each of the plurality of pocketed areas comprise a triangular shape with two closed sides and one open side for accepting a corner of the lower portion.

21. The assembly of claim 11, further comprising a printed design on at least a segment of the upper portion.

\* \* \* \* \*